UNITED STATES PATENT OFFICE.

J. LEWIS GEROLDSEX, OF LIVINGSTON, NEW YORK.

IMPROVED COMPOSITION FOR PAINTING.

Specification forming part of Letters Patent No. 44,178, dated September 13, 1864.

*To all whom it may concern:*

Be it known that I, J. LEWIS GEROLDSEX, of Livingston, Columbia county, State of New York, have invented a new and improved composition for painting, possessing the adhesive qualities of linseed-oil, together with the process of compounding the same; and I declare the following specification to be a full and complete description thereof.

I take twenty gallons of soft water and heat it until steam begins to ascend from it. Then I put the water, when thus heated, in a forty (40) gallon cask or barrel, and add to it five (5) pounds of blue vitriol dissolved in five (5) gallons of boiling water, and let the cask stand until the contents have cooled off. Then I add four (4) pounds of alum dissolved in five (5) gallons of boiling water, and let it stand about twelve hours. Then I add four (4) ounces of chloride of lime dissolved in one (1) gallon boiling water, and let it stand about two hours, and then add one (1) pint of aqua fortis, and then fill the cask with soft water. To ten (10) gallons of the above mixture I add one (1) gallon of linseed-oil. This makes a liquid for mixing colored paints possessing the drying and adhesive qualities of linseed-oil at a cost of about one-eighth the value of linseed-oil, and will spread over as large a surface, and when exposed to the weather is more durable than linseed-oil.

What I claim as my invention, and desire to secure by Letters Patent, is—

The composition of matter, together with the process of compounding or making the same, substantially as set forth in the above specification.

J. LEWIS GEROLDSEX.

Witnesses:
 JOHN WHITBECK,
 SAMUEL COLES.